United States Patent [19]

Matsushiro et al.

[11] Patent Number: 5,115,402

[45] Date of Patent: May 19, 1992

[54] SCAN-CONVERSION PROCESS AND PROCESSOR FOR CONVERTING A GRAPHIC PRIMITIVE TO A PIXEL MAP

[75] Inventors: Nobuhito Matsushiro; Hazime Hatanaka; Takayoshi Yoshida; Ikuo Oyake, all of Tokyo, Japan

[73] Assignee: Oki Electric Industry Co., Ltd., Tokyo, Japan

[21] Appl. No.: 390,818

[22] Filed: Aug. 8, 1989

[30] Foreign Application Priority Data

Aug. 15, 1988 [JP] Japan ................................. 63-201966

[51] Int. Cl.$^5$ ............................................ G06F 15/62
[52] U.S. Cl. ..................................................... 395/141
[58] Field of Search ................................ 364/518, 521

[56] References Cited

U.S. PATENT DOCUMENTS 4,815,009 3/1989 Blatin .................................... 364/518
4,897,805 1/1990 Wang .................................... 364/521
4,962,468 10/1990 Beauregard et al. ............... 364/521

Primary Examiner—Gary V. Harkcom
Assistant Examiner—Mark K. Zimmerman
Attorney, Agent, or Firm—Spencer & Frank

[57] ABSTRACT

A scan-conversion processor converts a graphic primitive defined by its outline to pixel data by storing edge data blocks containing the y-coordinates of the vertices of each edge, the x-coordinate of the lower vertex, and x-coordinate increment data. The edge blocks are linked in ascending order of teir minimum y-coordinate values into edge chains representing consecutive series of upward- or downward-inclined edges. Information indicating the edge inclination can also be stored in each edge data block, to support use of the non-zero-winding algorithm to discriminate between the interior and exterior of the graphic primitive. since it requires relatively little memory space, the scan-conversion processor, including its memory, can be implemented as a single integrated circuit on a semiconductor chip.

18 Claims, 12 Drawing Sheets

| | |
|---|---|
| aep (vp) | W1 |
| ecp | W2 |
| x | W3 |
| ymin | W4 |
| dx/dy | W5 |
| ymax | W6 |
| U or D | W7 |
| INTENSITY I | W8 |
| dI/dy | W9 |

NON-ZERO-WINDING
ALGORITHM

EVEN-ODD
ALGORITHM

SCAN-CONVERSION PROCESS AND PROCESSOR FOR CONVERTING A GRAPHIC PRIMITIVE TO A PIXEL MAP

BACKGROUND OF THE INVENTION

This invention relates to a scan-conversion process for converting a graphic primitive described by its outline to a pixel map suitable for raster output, and to a processor for executing this scan-conversion process.

Scan conversion is widely practiced in fields such as desktop publishing, computer-aided design, and computer graphics. In the desktop publishing field, for example, page description languages such as the well-known PostScript language enable graphic primitives such as characters and arbitrary graphic figures to be expressed in terms of their outlines. When such graphic primitives are printed or displayed on a raster output device such as a dot-matrix or laser printer or cathode-ray tube (CRT) display, the outlines must be filled in with pixels disposed on the scan lines of the output device. This filling-in process is the scan-conversion process.

In the past, the scan-conversion process has usually been executed by a general-purpose microprocessor, but it requires extensive computation, which can take considerable time. Software techniques have accordingly been developed to shorten the time, as described, for example, on pp. 456-460 of *Fundamentals of Interactive Computer Graphics* by J. D. Foley and A. Van Dam, published by the Addison Wesley Publishing Company in 1984.

The scan-conversion process described in this reference employs a bucket-sorted edge table having one "bucket" for each scan line. Information about the outline of a graphic primitive is stored in this table, information for each edge being stored in the bucket of the minimum y-coordinate of the edge. The scan-conversion process is executed one scan line at a time. An active edge table, indicating the edges that intersect the current scan line, is created and updated using the information in the bucket-sorted edge table.

A problem of this prior-art scan-conversion process is that it becomes inefficient in its use of memory when the number of scan lines is very large. Some raster output devices have a resolution of approximately 10,000×10,000 dots per page. If the scan-conversion process described above were to be applied, it would employ an edge table having 10,000 buckets, even for graphic primitives with a much smaller number of edges.

The scan-conversion process could be significantly speeded up by execution on a dedicated processor, instead of a general-purpose microprocessor. Ideally, the dedicated processor should be implemented as a single integrated circuit on a semiconductor chip. The amount of memory space needed to store the edge table in the prior-art scan conversion process, however, tends to preclude such a dedicated processor on a single chip, even if very-large-scale integration (VLSI) is employed. The edge table must therefore be stored in an external memory, but this complicates the design of the processing system. Extra time is also required to transfer edge information between the dedicated processor and external memory, thus delaying the scan-conversion process.

Another problem with the prior-art scan-conversion process is that it restricts the algorithm used to discriminate between the interior and exterior of a graphic primitive, hence imposes restrictions on the way in which a graphic primitive can be defined. The prior-art scan-conversion process employs a type of even-odd algorithm, in which every edge is assumed to be a boundary between the interior and exterior. This prevents the correct scan conversion of graphic primitives with a self-intersecting outline that may wind around an interior region twice.

The PostScript language, for example, enables two algorithms to be selected for interior-exterior discrimination: the even-odd algorithm, and the non-zero-winding algorithm. The non-zero-winding algorithm allows an outline to wind around an interior region any number of times, providing additonal flexibility in the definition of graphic primitives. The prior-art scan-conversion process described above does not support the non-zero-winding algorithm, hence it fails to support the full range of features provided by the widely-used PostScript language, and needed in many computer graphics applications.

SUMMARY OF THE INVENTION

It is accordingly an object of the present invention to scan-convert a graphic primitive in a way that makes efficient use of memory.

Another object of this invention is to provide a choice of algorithms for discriminating between the interior and exterior of a graphic primitive.

A further object of this invention is to implement a scan-conversion processor on a single semiconductor integrated-circuit chip.

This invention provides a scan-conversion process for converting a graphic primitive, defined in an x-y coordinate system by an outline comprising vertices joined by edges, to pixel data disposed on scan lines parallel to the x-axis. It also provides a scan-conversion processor.

The scan-conversion process comprises steps of:

(a) acquiring graphic primitive input data and creating vertex data blocks linked cyclically by vertex pointers in an order corresponding to the order of vertices on the outline of the graphic primitive;

(b) from these vertex data blocks, constructing edge data blocks comprising at least the minimum and maximum y-coordinate values on respective edges, the x-coordinate value of the vertex with the minimum y-coordinate on the edge, and the x-coordinate increment value with respect to a unit increment in the y-coordinate value on the edge;

(c) grouping the edge data blocks into edge chains representing consecutive upward-inclined or downward-inclined edges, the edge data blocks on respective edge chains being linked by edge chain pointers in ascending order of their minimum y-coordinate values; and (d) scanning the graphic primitive on successive scan lines, using the edge chains to identify edges intersecting the scan lines, using the x-coordinate values to create segments disposed on the scan lines in the interior of the graphic primitive, converting the segments to pixel data, and using the x-coordinate increment values to update the x-coordinate values.

The scan-coversion processor comprises:

an input register for temporarily storing graphic primitive input data;

an output register for temporarily storing information such as commands and requests;

a control unit for controlling the input register, the output register, and other units of the scan-conversion processor;

a scan-conversion memory for storing graphic primitive data acquired via the input register, vertex data blocks linked cyclically by vertex pointers, and edge data blocks comprising at least minimum and maximum y-coordinate values, x-coordinate values, and x-coordinate increment values, the edge data blocks being linked on a plurality of edge chains in ascending order of their minimum y-coordinate values;

a data bus for interconnecting the input register, the output register, the scan-conversion memory, and other units of the scan-conversion processor;

an address register for indicating locations at which data are stored in the scan-conversion memory;

an address bus for conveying address information from the address register to the scan-conversion memory;

a block address register file for furnishing the addresses of vertex data blocks and edge data blocks to the scan-conversion memory via the address bus, and for storing starting edge pointers to the edge chains;

an arithmetic and logic unit for receiving, for example, block address information from the block address register file, and executing addition, subtraction, and logical operations thereon;

a multiplier/divider for executing multiplication and division operations for calculating values such as the x-coordinate increment values;

a microprogram storage unit for storing microprograms executed by the control unit, comprising a first microprogram for creating the vertex data blocks from the graphic primitive input data, a second microprogram for constructing the edge data blocks from the vertex data blocks, and a third microprogram for scanning the graphic primitive on successive scan lines, using the edge chains to identify edges intersecting respective scan lines, using the x-coordinate values to create segments disposed on respective scan lines in the interior of the graphic primitive, converting the segments to pixel data, and using the x-coordinate increment values to update the x-coordinate values; and a memory controller for receiving the pixel data and writing them in an external device such as an image memory.

DETAILED DESCRIPTION OF THE EMBODIMENTS

A novel scan-conversion process and processor for converting a graphic primitive defined in an x-y coordinate system by an outline comprising vertices joined by edges to pixel data disposed on scan lines parallel to the x-axis of the coordinate system will be described below with reference to the drawings. The novel scan-conversion processor will be described with reference to FIG. 1. The novel scan-conversion process will be described with reference to FIGS. 2 to 20.

The description of the process will deal specifically with the scan conversion of a graphic primitive having a polygonal outline, for output on a monochrome raster output device having a range of intensity levels. The graphic primitive will be defined by a vertex list comprising the x-coordinate, y-coordinate, and intensity level of each vertex on its outline polygon. A graphic primitive with a self-intersecting outline will be used as an example.

As a variation, the scan-conversion of a graphic primitive defined by a pair of concentric circles will be discussed with reference to FIG. 21.

Figure 1:
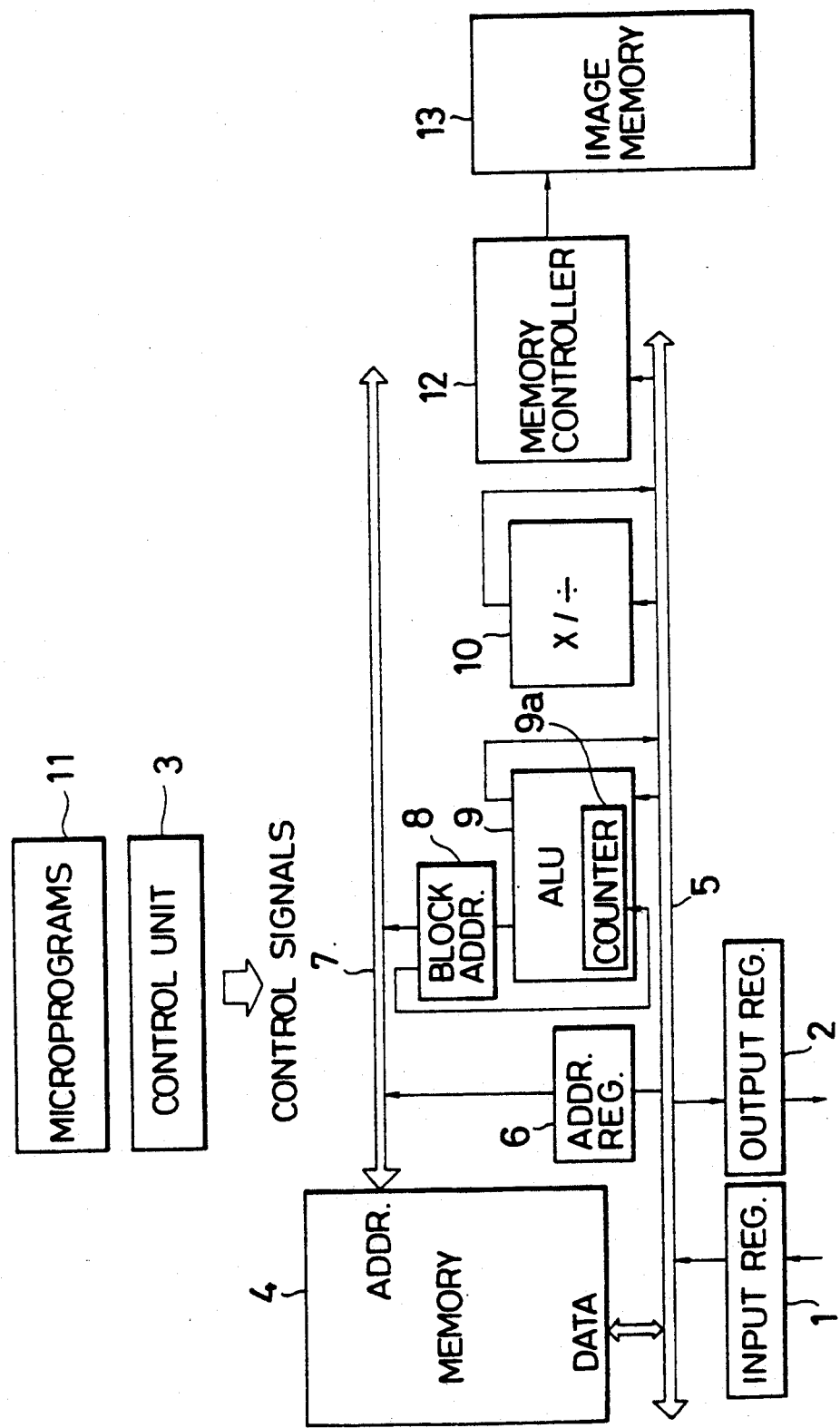
FIG. 1 is a block diagram of a scan-conversion processor embodying the present invention.

FIG. 1 is a block diagram of a novel scan-conversion processor which receives graphic primitive information from a graphic primitive output device (not shown in the drawing), converts this information to pixel data, and outputs the pixel data to an image memory such as a frame buffer or refresh buffer. From the image memory, the pixel data can be provided to a raster output device (not shown in the drawing) such as a printer or CRT.

The scan-conversion processor comprises an input register 1 and an output register 2 for the interchange of data with the graphic primitive output device. The input register 1 provides temporary storage for data received from the graphic primitive output device. The output register 2 provides temporary storage for information such as commands and requests to be sent to the graphic primitive output device.

The input register 1 and an output register 2 are controlled by a control unit 3, which sends them control signals by means of signal lines not individually shown in the drawing. The control unit 3 also controls the other units of the scan-conversion processor described below.

Graphic primitive information acquired using the input register 1 and the output register 2 under control of the control unit 3 are stored in a scan-conversion memory 4. The scan-conversion memory 4 also stores vertex data blocks and edge data blocks, the detailed structure of which will be illustrated in FIGS. 4, 6, 9, 10, 11.

The scan-conversion memory 4 is interconnected to the input register 1 and the output register 2 by a data bus 5. The data bus 5 also interconnects other units of the scan-conversion processor, described below.

When data are stored in the scan-conversion memory 4, they are stored at a location indicated by an address in an address register 6. The address information in this address register 6 is used for accessing the scan-conversion memory 4 in a linear manner.

An address bus 7 conveys the address information from the address register 6 to the scan-conversion memory 4.

The location at which vertex and edge data blocks are stored in the scan-conversion memory 4 are indicated by addresses in a block address register file 8. For example, the block address register file 8 stores starting edge pointers to the first edge data blocks on edge chains, which will be described later. The address bus 7 conveys address information from the block address register file 8 to the scan-conversion memory 4. When the block address register file 8 is used to access the scan-conversion memory 4, addresses of locations within the blocks are generated directly by the control unit 3.

The scan-conversion process involves addition, subtraction, and logical operations, which are executed by an arithmetic and logic unit (ALU) 9 under the control of the control unit 3. These operations are performed, for example, to increment block addresses obtained from the block address register file 8, and to increment values for discriminating between the interior and exterior of a graphic primitive. For this latter purpose, the ALU 9 has an internal counter 9a.

The scan-conversion process also involves multiplication and division operations, which are executed by a multiplier/divider 10.

The control unit 3 controls the other units by executing microprograms stored in a microprogram storage unit 11. These microprograms comprise at least a first microprogram for performing a process that will be illustrated in FIG. 3, a second microprogram for performing a process that will be illustrated in FIG. 7, and a third microprogram for performing the process that will be illustrated in FIG. 12.

A a result of the execution of these microprograms, the input graphic primitive is divided into segments disposed on the scan lines of the raster output device. The segments are converted to pixel data which are provided to a image memory controller 12.

The image memory controller 12 completes the scan-conversion process by writing the pixel data in an image memory 13. From the image memory 13, the pixel data can be furnished as needed to the raster output device.

The image memory 13 is not part of the scan-conversion processor, so further description of it will be omitted.

Next a description of the novel scan-conversion process will be given with reference to FIGS. 2 to 20. This description will also explain the operation of the novel scan-conversion processor shown in FIG. 1.

Figure 2:
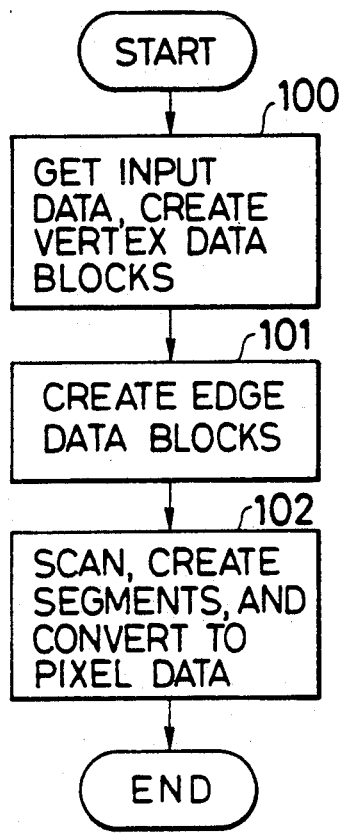
FIG. 2 is a general flowchart of a scan-conversion process embodying the present invention.

FIG. 2 is a general flowchart of the novel scan-conversion process. It begins with the acquisition of graphic primitive input data from an external graphic primitive output device, and the creation of vertex data blocks linked cyclically by vertex pointers in an order corresponding to the order of vertices on the outline of the graphic primitive (step 100). This process will be described later with reference to FIG. 3. The vertex data blocks are stored in the scan-conversion memory 4 in FIG. 1.

Next, edge data blocks are created from the vertex data blocks (step 101). The edge data blocks comprise the minimum and maximum y-coordinate values on corresponding edges, the x-coordinate value of the vertex with the minimum y-coordinate on the edge, the x-coordinate increment value with respect to a unit increment in the y-coordinate value on the edge, and other information. A feature of this process is that the edge data blocks are grouped into edge chains representing consecutive upward-inclined or downward-inclined edges, the edge data blocks on respective edge chains being linked by edge chain pointers in ascending order of their minimum y-coordinate values. This process will be described later with reference to FIG. 7.

Finally, the graphic primitive is scanned on successive scan lines, the edge data blocks are used to identify edges intersecting the scan lines, the x-coordinate values in the edge blocks are used to create segments disposed on the scan lines in the interior of the graphic primitive, and the segments are converted to pixel data which are output to the image memory 13 in FIG. 1 (step 102). During this process, the x-coordinate values are updated using the x-coordinate increment values. This process will be described later with reference to FIG. 12.

Another feature of this process is that to conserve memory space, the vertex data blocks can be reused as the edge data blocks. Moreover, the process does not require an edge table with an entry for every scan line as in the prior art, so it requires relatively little scan-conversion memory space. In consequence, it can be implemented by an integrated circuit on a single semiconductor chip. In particular, the entire scan-conversion processor in FIG. 1, including the scan-conversion memory 4 (although not the image memory 13, which is not part of the scan-conversion processor) can be integrated on a single semiconductor chip, enabling the construction of desktop publishing, computer-aided design, and computer graphics systems that are high in speed and comparatively simple in design.

Figure 3:
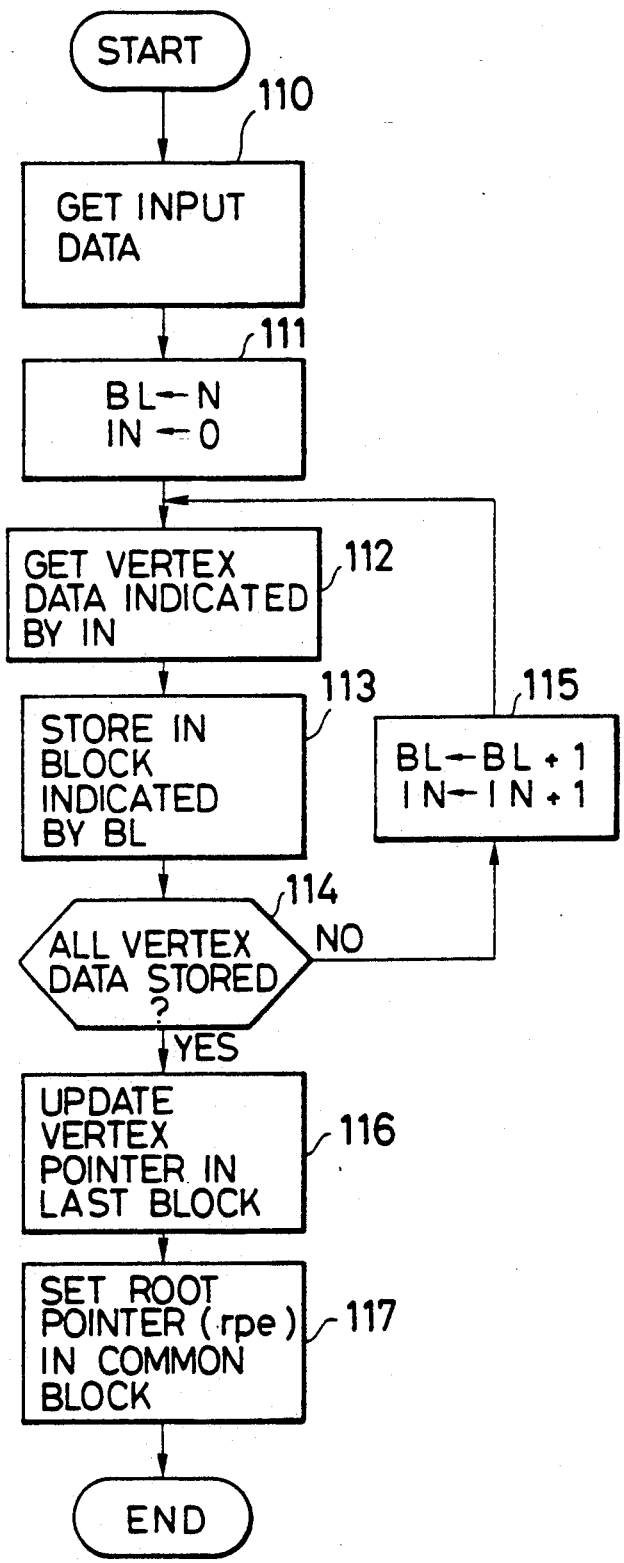
FIG. 3 is a more detailed flowchart of the data input process, including the process of creating vertex data blocks.

A more detailed description will next be given of the process of acquiring the graphic primitive data and creating vertex data blocks, with reference to FIG. 3.

First the graphic primitive data are input from the graphic primitive output device. This is accomplished by having the control unit 3 in FIG. 1 place commands in the output register 2 that cause the graphic primitive output device to respond by writing graphic primitive data in the input register 1. The graphic primitive data are latched in the input register 1, then stored in an input data area in the scan-conversion memory 4 (step 110).

The graphic primitive data comprise both a vertex list and information designating the algorithm to be used to discriminate the interior and exterior of the graphic primitive. The vertex list gives the x-coordinate, y- coordinate, and intensity level of each vertex defining the polygonal outline of the graphic primitive. The outline of the graphic primitive comprises edges that join the vertices in their order on the vertex list, the last vertex also being joined to the first. The first vertex will be referred to as vertex number 0, the next vertex as vertex number 1, and so on up to vertex number M−1 (the last vertex), M being the total number of vertices. The vertex list can be generated by tracing the outline of the graphic primitive in either the clockwise direction or the counterclockwise direction.

When input of the graphic primitive data is completed, vertex data blocks are created. First, a vertex-number parameter IN and a block-number parameter BL are initialized (step 111). The vertex-number parameter IN is initialized to zero. The block-number parameter BL is initialized to a value N, which may be calculated, for example, from the number of vertices M and the ratio of the block size to the amount of input data per vertex. The block-number parameter is stored in the block address register file 8 in FIG. 1.

Next, the vertex data of the vertex with the number indicated by the vertex-number parameter IN are fetched from the input data area (step 112), and stored in a block in the scan-conversion memory 4, the block address being indicated by the block-number parameter BL (step 113).

Figure 4:
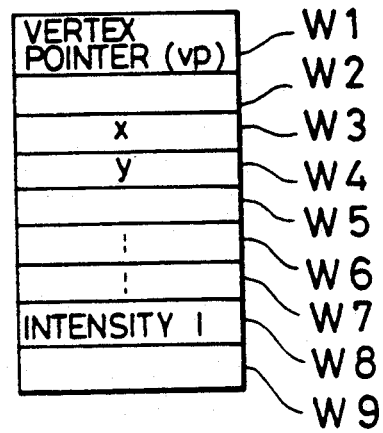
FIG. 4 illustrates the word structure of a vertex data block.

FIG. 4 shows the structure of a vertex data block. The block comprises a number of words, shown for convenience as nine words in FIG. 4, although in practice the number of words will usually be a power of two. In the first word (W1) is stored a value equal to the current value of the block-number parameter BL plus one, this becoming a vertex pointer (vp) to the next vertex data block. The x-coordinate of the vertex is stored in the third word W3, the y-coordinate of the vertex is stored in the fourth word W4, and the intensity level of the vertex is stored in the eighth word W8. The seventh word W7 is cleared to a value such as zero, and the other words remain unaltered, containing meaningless data at this stage.

The word addresses in the block are supplied by the control unit 3 via the address register 6 in FIG. 1.

Next, a decision is made as to whether the structuring process comprising steps 112 and 113 has been completed for the last vertex in the input graphic primitive data (step 114). If it has not been completed, the block-number parameter BL and the vertex-number parameter IN are incremented, then the process returns to the above-described step 112 (step 115).

If the structuring process has been completed for the last vertex, the vertex pointer (vp) of the last block is replaced with the value N, pointing to the first block (step 116). The vertex data blocks are now linked by the vertex pointers in a cyclic order corresponding to the order of the vertices on the outline of the graphic primitive. The value N is also stored in a common block CBL, more specifically in a root pointer entry (rpe) in the common block CBL (step 117). The common block is stored in the block address register file 8 in FIG. 1.

Figure 5:
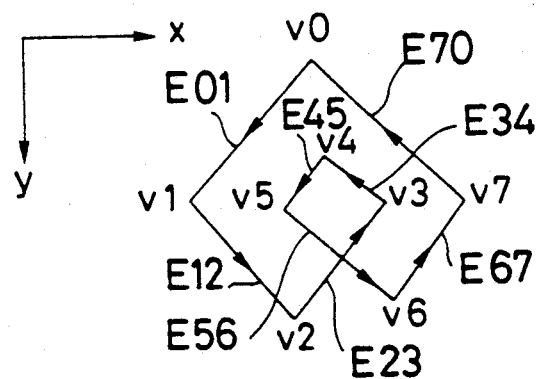
FIG. 5 illustrates a graphic primitive with a self-intersecting outline.
Figure 6:
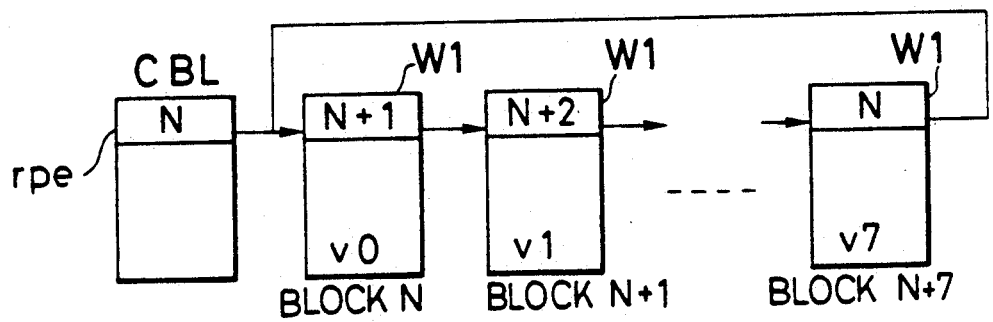
FIG. 6 illustrates the vertex pointer structure for the graphic primitive in FIG. 5.

An example of the data structure resulting from the foregoing process will be described with reference to FIGS. 5 and 6. FIG. 5 shows a graphic primitive comprising eight vertices v0 to v7 linked in the counterclockwise direction. The coordinates and intensities of these vertices are input in order from v0 to v7, then these vertex data are stored in blocks N to N+7 as illustrated in FIG. 6. The vertex pointers in blocks N to N+7 (the data in the first word W1 in each block) have a cyclic structure, while the root pointer entry (rpe) in the common block CBL indicates the block N of the first vertex.

Next, the process of creating edge data blocks will be described with reference to FIG. 7.

First, a block parameter BP is initialized to the value in the root pointer entry (rpe) of the common block CBL (step 120). Then the y-coordinate values in the vertex data block currently indicated by the block parameter BP and the next vertex data block (indicated by the vertex pointer in that block) are compared to determine whether the edge joining the two corresponding vertices is inclined in the upward or downward direction (step 121). If the y-coordinate in the current block is less than the y-coordinate in the next block, the edge is determined to be an upward-inclined edge, hereinafter referred to as a U edge. Otherwise, it is determined to be a downward-inclined edge, hereinafter referred to as a D edge (step 122).

Figures 8, 9:
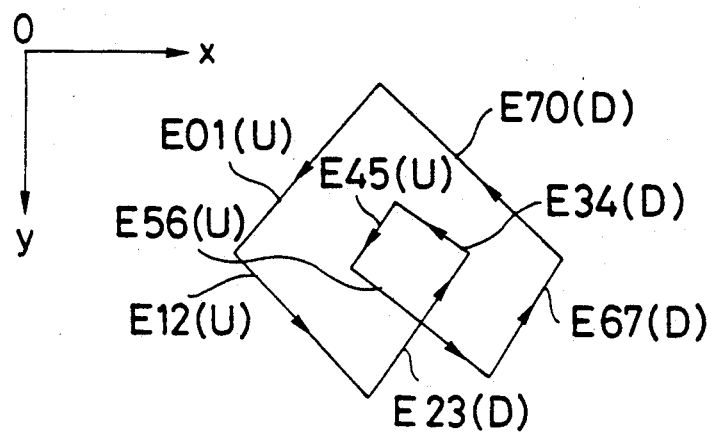
FIG. 8 illustrates U and D edges.
FIG. 9 illustrates the word structure of an edge data block.

FIG. 8 shows the edges of the graphic primitive in FIG. 5 labeled as being U or D edges. The usual sense of up and down is reversed because the positive y-axis points downward, as is common in the x-y coordinate systems of CRT displays.

If the edge is determined to be a D edge, the block parameter BP is updated to the value indicated by the vertex pointer (vp) of the current vertex data block, that is, it is updated to indicate the next vertex data block, and the process returns to step 121 (step 123). If the edge is determined to be a U edge, edge data describing this edge are now stored in the block currently indicated by the block parameter BP (step 124).

Accordingly, the block in the scan-conversion memory 4 which up until now held vertex data for one of the vertices of the edge is used as the storage area for the edge data. More specifically, the edge data are stored in the block that until now held the data concerning its beginning vertex with respect to the cyclic order of vertices on the outline of the graphic primitive. For a closed curve, the number of vertices equals the number of edges, so the vertex data blocks are exactly sufficient in number for reuse as the edge data blocks.

FIG. 9 illustrates the word structure of the edge data. An active edge pointer (aep) is stored in the first word W1, an edge chain pointer (ecp) is stored in the second word W2, the x-coordinate of the vertex having the minimum y-coordinate value on the edge is stored in the third word W3, that minimum y-coordinate value (ymin) is stored in the fourth word W4, the x-coordinate increment value (dx/dy) with respect to a unit increment of the y-coordinate value is stored in the fifth word W5, the maximum y-coordinate value (ymax) on the edge is stored in the sixth word W6, edge inclination information indicating whether the edge is a U edge or a D is stored in the seventh word W7, the intensity value of the vertex having the minimum y-coordinate value is stored in the eighth word W8, and the increment (dI/dy) of the intensity value with respect to a unit increment of the y-coordinate value is stored in the ninth word W9. In step 124, data are stored in the third through ninth words (W3 through W9). The first two words retain their existing values, the vertex pointer (vp) being stored in the first word W1 and meaningless data in the second word W2.

Creation of the increment data stored in the fifth and ninth words W5 and W9 requires multiplication and division operations, which are performed by the multiplier/divider 10 in FIG. 1.

When the creation and storage of data for one edge have been completed in step 124, the block parameter BP is updated to the value of the vertex pointer (vp) of the current block, which indicates the next vertex data block (step 125), after which a decision is made as to whether data have been created and stored for all edges (step 126). This decision can be made according to whether edge inclination data are stored in the seventh word W7 of the block indicated by the block parameter BP, because this word was cleared to a value such as zero not representing either the U or D inclination when the vertex data were stored.

If the decision result in step 126 is negative, a return is made to the above-described step 124 to create and store data for further edges. If the decision result is affirmative, the process proceeds to step 127, which will be described later.

It is important that the process of creating and storing edge data in step 124 begin with a U edge. If this process began with a D edge, information needed for creating the increment data in the sixth and ninth words W6 and W9 would be lost during the processing of the preceding block.

Figure 10:
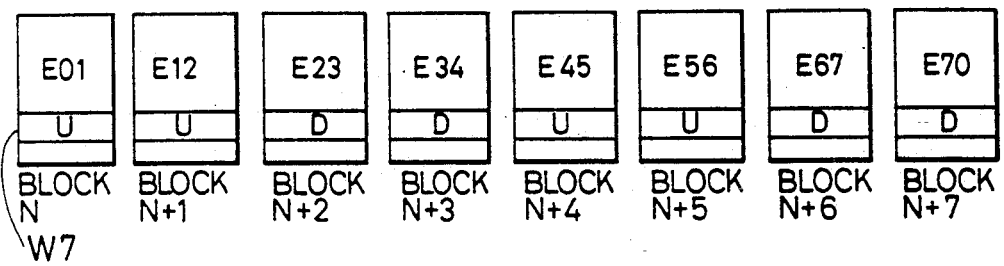
FIG. 10 illustrates the edge inclination data stored for the graphic primitive in FIG. 5.

For the graphic primitive example in FIG. 8, the process through step 126 creates blocks of edge data as illustrated in FIG. 10, data for the edges E01 to E70 shown in FIG. 5 being stored in the blocks N to N+7. The edges E01, E12, E45, and E56 are U edges, so information denoting a U edge is stored in the seventh word of blocks N, N+1, N+4, and N+5. The edges E23, E34, E67, and E70 are D edges, so information denoting a D edge is stored in blocks N+2, N+3, N+6, and N+7.

Figure 7:
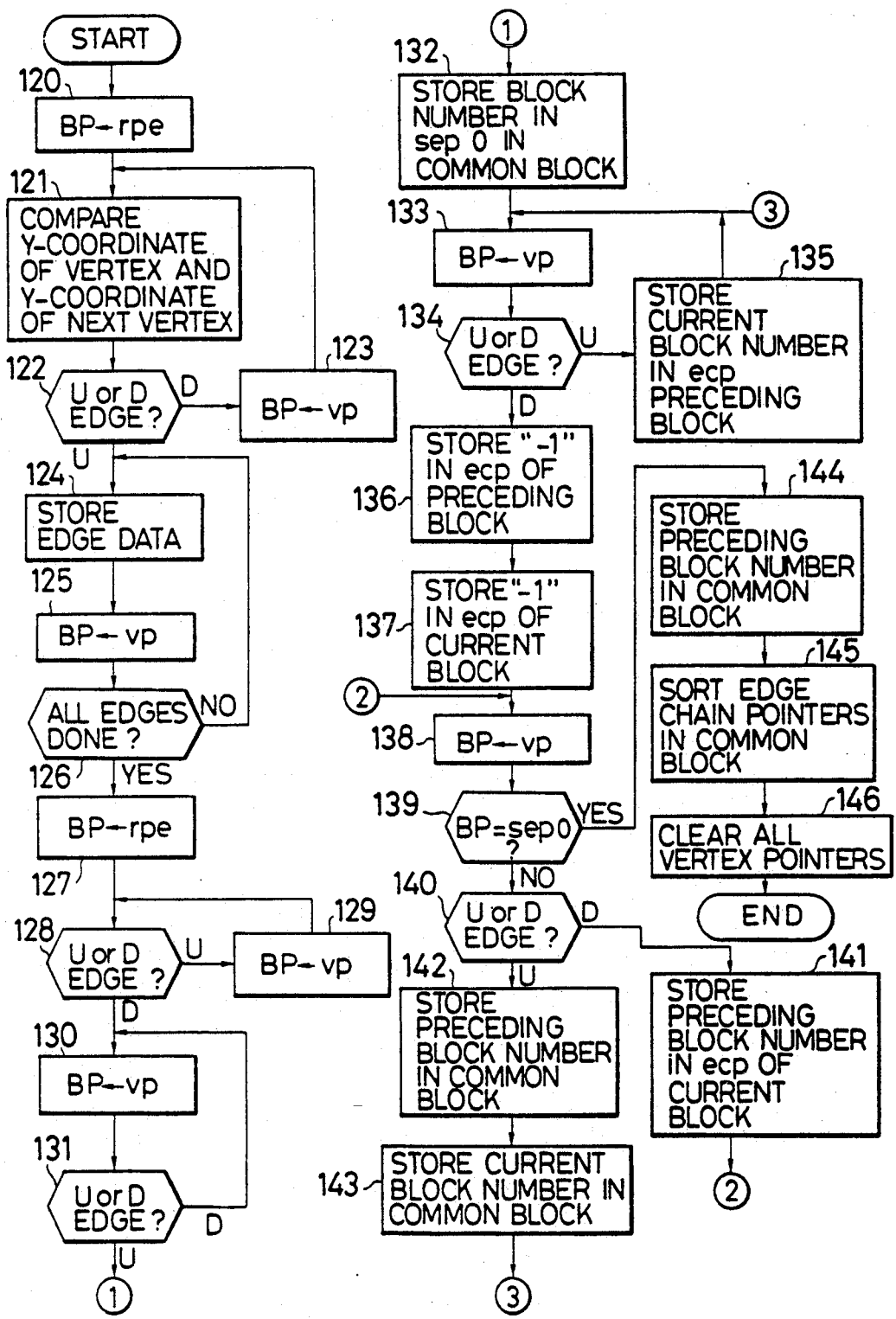
FIG. 7 is a detailed flowchart of the process of creating edge data blocks.

After the blocks of edge data have been created as described above, edge chains are formed by a process exemplified by steps 127 to 146 in FIG. 7. An edge chain represents a consecutive series of U edges or D edges. The corresponding edge data blocks are grouped by setting edge chain pointers (ecp) in their second words W2.

The process of forming edge chains can be broken down as follows. First, a U edge preceded by a D edge is found (steps 127 to 131 in FIG. 7).

Next, the edge data blocks representing this and any consecutive U edges are linked on an edge chain in ascending order of their minimum y-coordinate values, and a starting edge pointer to the first edge data block on this edge chain is set in a common data block (steps 132 to 136, and step 143). Then the next D edge is found, the edge data blocks of this and any consecutive D edges are linked on an edge chain in ascending order of their minimum y-coordinate values, and a starting edge pointer to the first edge data block on this edge chain is set in the common data block (steps 137 to 142).

Then the next U edge is found and tested to decide whether it is the edge found in steps 127 to 131. In FIG. 7, this decision is actually made during the creation of the preceding chain of D edges, as step 139. If the decision result is negative, the process described in the preceding paragraph is repeated.

Finally, the starting edge pointers in the common block are sorted in ascending order of the minimum y-coordinate values in the edge data blocks to which they point, and the active edge pointers in all the edge data blocks are cleared.

A detailed procedure for carrying out the edge chain formation process will now be described with reference to FIG. 7.

First, the block parameter BP is again initialized to the value in the root pointer entry (rpe) in the common block CBL (step 127). Next, the seventh word W7 of the block indicated by the block parameter BP is read to determine whether the associated edge is a U edge or a D edge (step 128). If the edge is a U edge, the block parameter BP is updated to the value indicated by the vertex pointer (vp) in the first word (step 129), and a return is made to step 127.

If the edge is a D edge, the block parameter BP is similarly updated to the value indicated by the vertex pointer (step 130), and the seventh word W7 in the block now indicated by the block parameter BP is read to determine whether the edge associated with that block is a U edge or a D edge (step 131). In this case, if the edge is a D edge, a return is made to step 130, but if the edge is a U edge, the process proceeds to the step 132 described below.

The effect of the foregoing steps 127 to 131 is to find a U edge which is preceded by a D edge on the outline of the graphic primitive. When such a U edge has been found, its block number is set in a first starting edge pointer (sep0) in the common block CBL (step 132).

Next the block parameter BP is updated to the value indicated by the vertex pointer (vp) in the current block (step 133), and the seventh word W7 in the block now indicated by the block parameter BP is read to determine whether the associated edge is a U edge or a D edge (step 134).

If the edge is a U edge, since it is consecutive with the preceding U edge, the block number of this block is stored in the edge chain pointer (ecp) of the preceding block (step 135) and a return is made to step 133. Repetition of steps 133 to 135 creates an edge chain of edge data blocks representing consecutive U edges.

If the result of the decision in step 134 is that the edge is a D edge, a special value (such as −1) is stored in the edge chain pointer (ecp) of the preceding block to terminate the edge chain representing consecutive U edges (step 136). A special terminating value is also stored and in the edge chain pointer of the current block (step 137). The reason for step 137 is that when edge data blocks representing D edges are found by following the vertex pointers, they are found in descending order of their minimum y-coordinate values, hence the last block on the edge data chain is found first.

Next, the block parameter BP is updated to the value indicated by the vertex pointer (step 138), and this value is compared with the value in the first starting edge pointer (sep0) in the common block CBL (step 139). If these two values are unequal, indicating that the process of forming edge chains is not complete, the seventh word W7 in the block now indicated by the block parameter BP is read to determine whether the associated edge is a U edge or a D edge (step 140).

If the edge is a D edge, since it is consecutive with the preceding D edge, the block number of the preceding edge data block is stored in the edge chain pointer (ecp) of the current block, thus linking these blocks in ascending order of their minimum y-coordinate values, and the process returns to the above-mentioned step 138 (step 141).

If the decision result in step 140 is that the edge is a U edge, thus ending the consecutive series of D edges, the block number of the preceding block is stored in the next starting edge pointer (sep1, sep2, . . . ) in the common block CBL as a pointer to the first block on an edge chain (step 142). This completes the creation of an edge chain of edge data blocks representing consecutive D edges.

Next, the block number of the current block is stored in the next starting edge pointer in the common block CBL, as a pointer to the first block in a U edge chain (step 143). Then a return is made to step 133 to continue formation of this U edge chain.

If the decision result in step 139 is that the value of the block parameter BP equals the value of the first starting edge pointer (sep0) in the common block CBL, indicating that all edge chains have been completed, the block number of the preceding block is stored in the next starting edge pointer in the common block CBL as a pointer to the first block of an edge chain (step 144), then the starting edge pointers in the common block CBL are re-sorted in ascending order of the minimum y-coordinate values in the blocks to which they point (step 145).

When the creation of edge chains is completed in this way, the first words W1 of all the edge blocks, which until now held the vertex pointers (vp), are cleared in preparation for the next process, in which they will hold active edge pointers (step 146). This completes the edge chain formation process.

Figure 11:
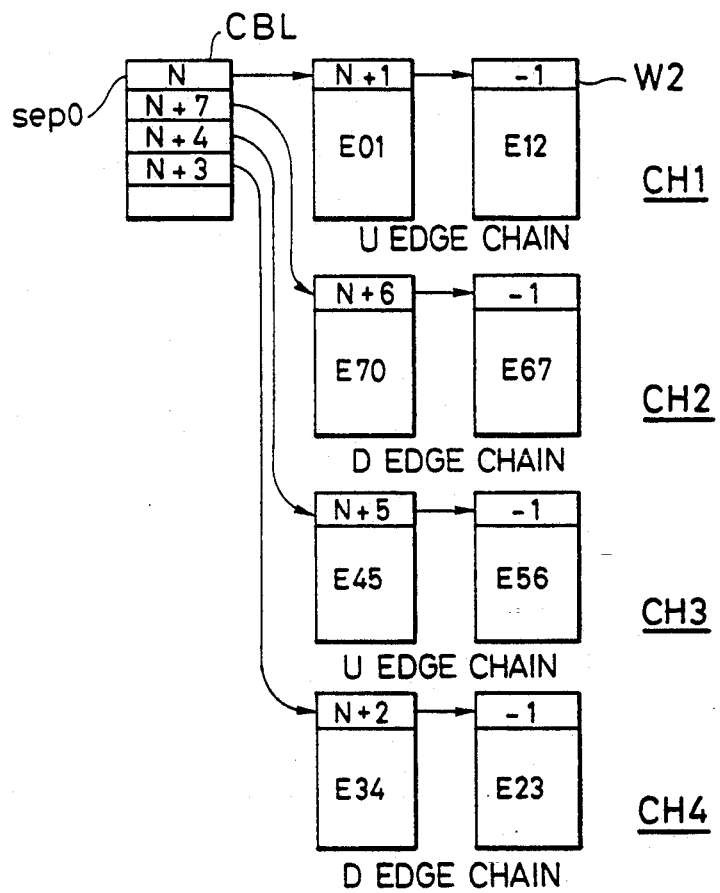
FIG. 11 illustrates the edge chains created for the graphic primitive in FIG. 5.

For the graphic primitive example illustrated in FIGS. 5 and 8, there are four groups of consecutive U edges or D edges: a group comprising the edges E01 and E12, a group comprising the edges E67 and E70, a group comprising the edges E23 and E34, and a group comprising the edges E45 and E56. Execution of the process described above thus creates four edge chains CH1 to CH4 as illustrated in FIG. 11.

Next, a detailed description of the process of scanning the graphic primitive, creating segments disposed on the scan lines in the interior of the graphic primitive, and converting these segments to pixel data for output to image memory will be given with reference to FIG. 12.

This process examines the graphic primitive on successive scan lines, proceeding from the scan line with the minimum y-coordinate value occurring in the graphic primitive to the scan line with the maximum y-coordinate value occuring in the graphic primitive. The y-coordinate value of the scan line currently under examination is stored in a parameter denoted sy in FIG. 12.

During this process, an active edge chain representing edges that intersect the current scan line is maintained by means of the active edge pointers (aep) in the first words of the edge data blocks. A root pointer (aep0) to the first block in the active edge chain is maintained in the common block CBL. Maintenance of the active edge chain involves processes of sorting and the relinking of the active edge pointers, which are carried out by well-known techniques that will not be described in detail.

Since the active edge pointers were cleared at the end of the preceeding process, the active edge chain is initially empty.

Figure 12:
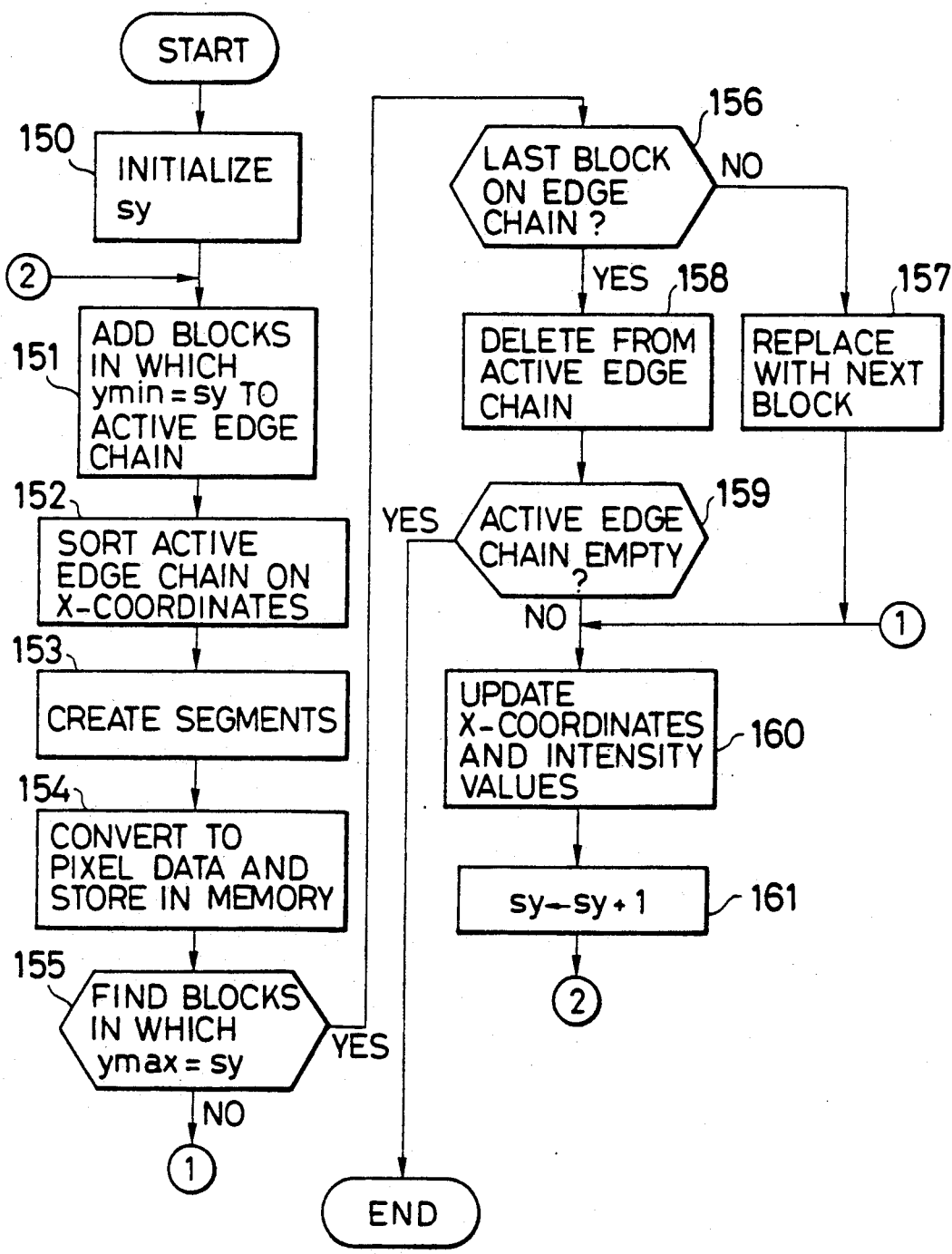
FIG. 12 is a detailed flowchart of the process of scanning the graphic primitive and converting it to pixel data.

The process begins by initializing the scan-line coordinate value (sy) to the minimum y-coordinate value (ymin) of the first edge data block on the first edge chain, indicated by the first starting edge pointer (sep0) in the common block CBL (step 150 in FIG. 12).

Next, all edge data blocks that are disposed at the beginning of edge chains and in which the minimum y-coordinate value (ymin) equals the scan-line y-coordinate value (sy) are added to the active edge chain (step 151). In this step the starting edge pointers in the common block CBL are used to identify the blocks at the beginning of the edge chains. Since the starting edge pointers are sorted in ascending order of the minimum y-coordinate value, this step can be performed rapidly. In many cases it will only be necessary to test one block.

Next the edge data blocks on the active edge chain are sorted in ascending order of the x-coordinate values in their third words W3, and their active edge pointers (aep) are relinked in this order (step 152). The block number of what is now the first block on the active edge chain is stored in the root active edge pointer (aep0) in the common block CBL, and a special value (such as $-1$) is stored in what is now the last block on the active edge chain, to indicate that it is last.

Next, segments disposed on the current scan line in the interior of the graphic primitive are created using the x-coordinates in the third words of the blocks on the active edge chain (step 153). The algorithm used to discriminate between the interior and exterior of the graphic primitive can be either the non-zero-winding algorithm or the even-odd algorithm, as designated by the graphic primitive output device when the graphic primitive data were originally input.

If the non-zero-winding algorithm is designated, the counter 9a in the ALU 9 is cleared to 0, then the edge inclination data in the seventh word W7 of the blocks on the active edge chain are examined in the order of the active edge pointers. For each block, the counter 9a is incremented by 1 if the edge inclination data indicates a U edge, and decremented by 1 if the edge inclination data indicates a D edge. Whenever the value of the counter 9a changes from zero to a non-zero value, the x-coordinate value in the third word W3 of the associated block is taken as the beginning of a segment. When next the value of the counter 9a returns to zero, the x-coordinate value in the third word W3 of the associated block is taken as the end of that segment.

Figure 13:
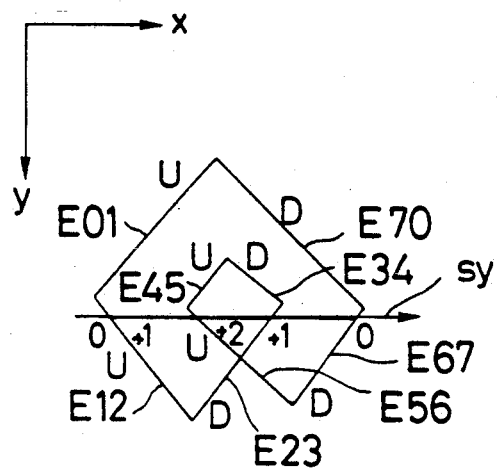
FIG. 13 illustrates the non-zero-winding algorithm.

FIG. 13 illustrates this algorithm for one of the scan lines intersecting the example graphic primitive in FIG. 5. For this scan line, the active edge chain comprises edge data blocks representing the edges E12 (U), E56 (U), E23 (D), and E67 (D). The value of the counter 9a changes from zero to one at the edge E12, then to two at the edge E56, then to one at the edge E23, and returns to zero at the edge E67. A single segment is thus created from the x-coordinate of the edge E12 to the x-coordinate of the edge E67 (indicated by the thick line in the drawing).

If the even-odd algorithm is designated, the counter 9a in the ALU 9 is cleared to 0, then the blocks on the active edge chain are taken in the order of the active edge pointers and the counter 9a is incremented by one for each block. When the counter 9a changes from an even value to an odd value, the x-coordinate value in the third word W3 of the associated block is taken as the beginning of a segment. When the counter 9a next returns from an odd value to an even value, the x-coordinate value in the third word W3 of the associated block is taken as the end of that segment.

Figure 14:
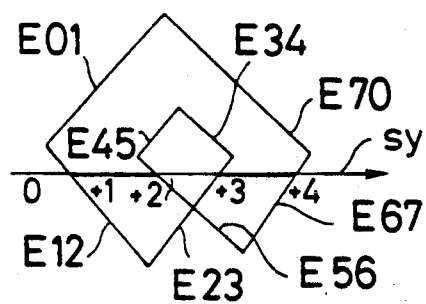
FIG. 14 illustrates the even-odd algorithm.

FIG. 14 illustrates the even-odd algorithm for the same scan line as in FIG. 13. The value of the counter 9a changes from zero to one at the edge E12, to two at the edge E56, to three at the edge E23, and to four at the edge E67. Segments are thus created from the x-coordinate of the edge E12 to the x-coordinate of the edge E56, and from the x-coordinate of the edge E23 to the x-coordinate of the edge E67 (indicated by the thick lines in the drawing).

As illustrated in FIGS. 13 and 14, by selecting the interior-exterior discrimination algorithm, the graphic primitive output device can choose whether parts of a graphic primitive that are doubly enclosed by the outline are to be considered as interior or exterior to the graphic primitive. This choice simplifies the definition of many types of graphic primitives, such as those comprising a plurality of overlapping parts.

After segments have been created on the current scan line in this way, they are converted to pixel data which are furnished to the image memory controller 12 in FIG. 1 and stored in the image memory 13 (step 154). In this process, the intensity data in the eighth words W8 of the blocks associated with the end points of a segment are used to calculate an intensity value for each pixel in the segment. Interpolation is performed, so that the pixel values shade gradually from the intensity at one end point to the intensity at the other end point. Pixel addresses are also generated and provided to the memory controller 12. The necessary calculations are carried out by the ALU 9 and the multiplier/divider 10 at the direction of the control unit 3. The segment-to-pixel conversion process is well known, so a detailed description will be omitted.

Next, the active edge chain is searched to find any edge data blocks thereon the maximum y-coordinate values (ymax) of which equal the scan-line y-coordinate value (sy) (step 155). If none are found, the process proceeds to step 160, described later.

In each block in which the maximum y-coordinate value (ymax) equals the scan-line y-coordinate value (sy), the edge chain pointer (ecp) of the block is read to determine whether the block is the last block on its edge chain (step 156). If it is not the last block on its edge chain, the block is replaced on the active edge chain by the block indicated by its edge chain pointer, this being the next edge data block on its edge chain (step 157).

If a block considered in step 156 is the last block on its edge chain, it is deleted from the active edge chain (step 158), and a decision is made as to whether the active edge chain is now empty (step 159). If the active edge chain is empty, the scan conversion process terminates.

After the foregoing process has been completed for all blocks in which the maximum y-coordinate value equals the scan-line y-coordinate value, the x-coordinate value in the third word W3 and the intensity value in the eighth word of each block on the active edge chain are updated by the x-coordinate increment value dx/dy in the sixth word and the intensity increment value dI/dy in the ninth word of that block (step 160). Then the scan-line y-coordinate value (sy) is incremented by one unit to the value on the next scan line, and a return is made to step 151 to process the next scan line (step 161). The process thus continues until the active edge chain is empty, at which point the graphic primitive has been entirely converted to pixel data.

The steps in FIG. 12 will next be illustrated with reference to FIGS. 15 to 20 for the example graphic primitive shown in FIG. 5. More specifically, the various types of changes made in the active edge chain will be illustrated. Each drawing will show the current scan line disposed at a certain position in the graphic primitive, and illustrate the state of the active edge chain before and after that scan line is processed.

Figure 15:
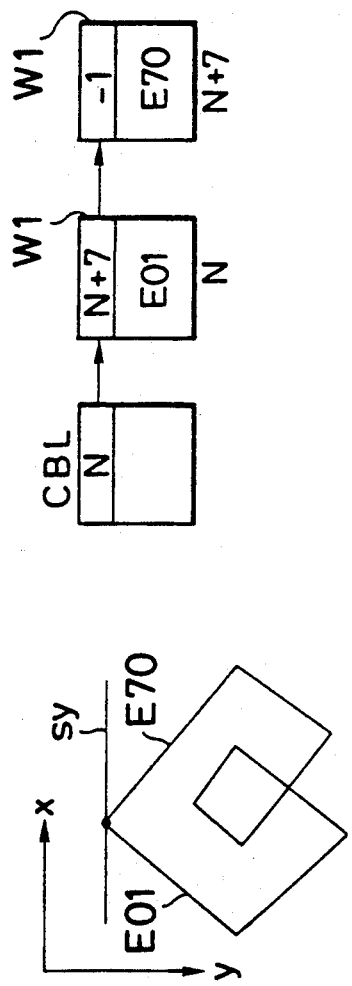
FIG. 15 illustrates the initial state of the active edge chain for the graphic primitive in FIG. 5.

FIG. 15 shows the initial state, when the scan line is at the smallest y-coordinate value of the edge E01 (step 150 in FIG. 12). Prior to this state, the active edge chain is empty. In this state, two blocks are added to the active edge chain: the blocks N and N+7, which store the edge data for the edges E01 and E70.

Figure 16:
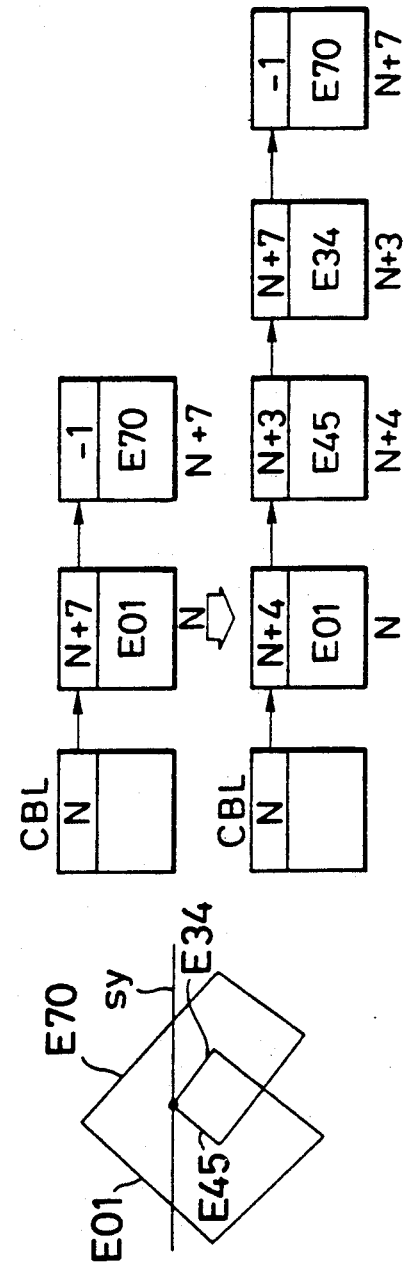
FIG. 16 illustrates the addition of blocks to the active edge chain.

FIG. 16 illustrates the addition of new blocks to the active edge chain. When the scan line reaches the minimum y-coordinate value of the edges E34 and E45, the blocks N+3 and N+4 representing these edges are added to the active edge chain (step 151 in FIG. 12), and the active edge chain is re-sorted (step 152 in FIG. 12) so that it comprises the blocks N, N+3, N+4, and N+7 in this order.

Figure 17:
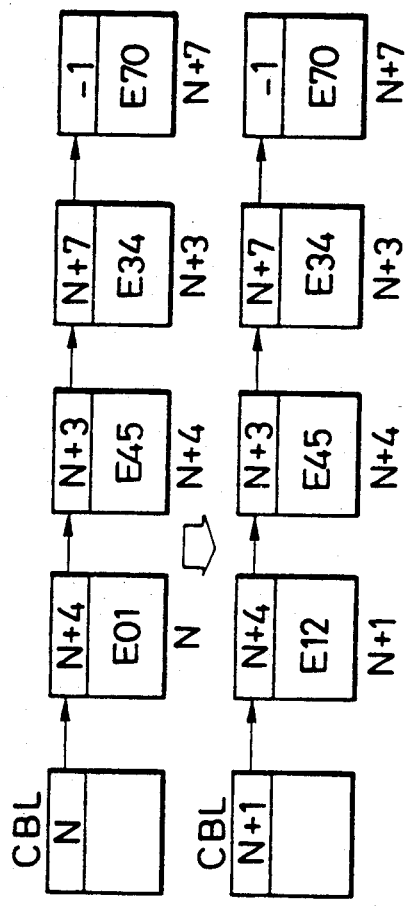
FIG. 17 illustrates the replacement of a block on the active edge chain.
Figure 17:
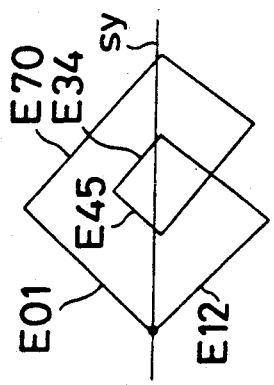

FIG. 17 illustrates the replacement of a block on the active edge chain by the next block in its edge chain. When the scan line reaches the maximum y-coordinate value of the edge E01, the corresponding block N is tested (in step 156 in FIG. 12) and found not to be the last block on its edge chain, so it is replaced on the active edge chain by the block indicated by its edge chain pointer (step 157 in FIG. 10). That is, the block N is replaced by the block N+1 representing the edge E12.

Figure 18:
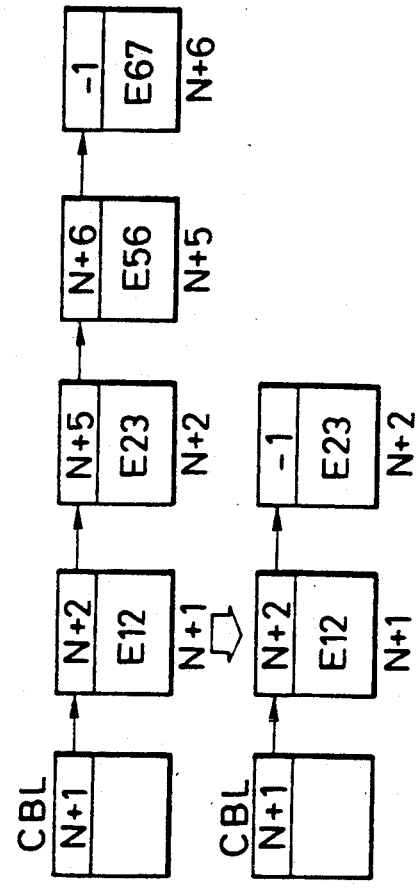
FIG. 18 illustrates the deletion of blocks from the active edge chain.
Figure 18:
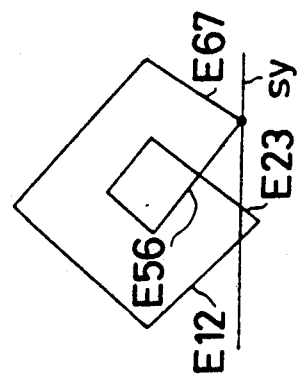

FIG. 18 illustrates the deletion of blocks from the active edge chain. When the scan line reaches the maximum y-coordinate value of the edges E56 and E67, the corresponding blocks N+5 and N+6 are tested (in step 156 in FIG. 12) and found to be the last blocks on their edge chains, so they are deleted from the active edge chain (step 158 in FIG. 12).

Figure 19:
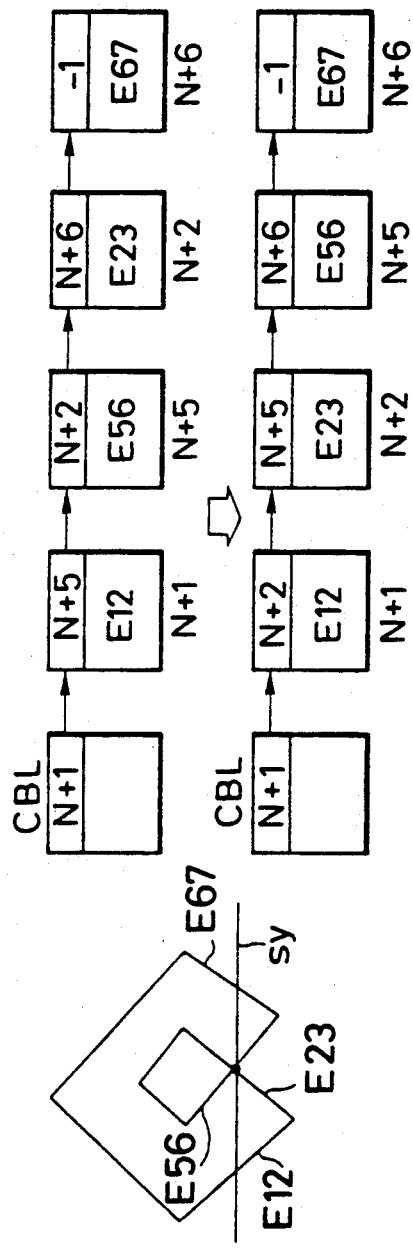
FIG. 19 illustrates the re-ordering of blocks on the active edge chain.

FIG. 19 illustrates the re-ordering of blocks on the active edge chain. In this drawing the scan line has reached a non-vertex point of intersection of the edges E56 and E23. As the next-to-last step in the processing of this scan line (step 160 in FIG. 12), the x-coordinates in the third words of the edge data blocks are updated to their values on the next scan line, as a result of which the x-coordinate values of the blocks N+5 and N+2 are no longer in ascending order. When the active edge chain is re-sorted in preparation for the creation of segments on the next scan line (step 152 in FIG. 10), these two blocks accordingly change places.

Figure 20:
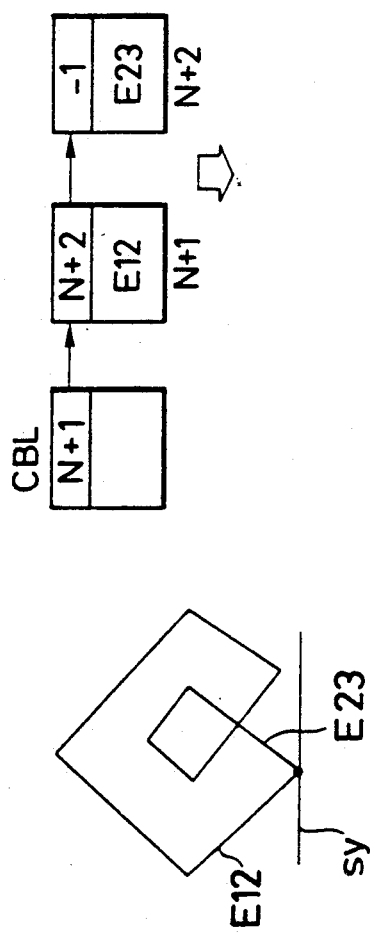
FIG. 20 illustrates the termination of the scan-conversion process.

FIG. 20 illustrates the termination of the process. When the scan line reaches the maximum y-coordinate value of the edges E12 and E23, since the corresponding blocks N+1 and N+2 are the last blocks on their respective edge chains, they are deleted from the active edge chain as explained in connection with FIG. 18. Then the active edge chain is tested and found to be empty (step 159 in FIG. 12), so the scan-conversion process terminates.

When the process terminates, pixel data for the entire interior of the graphic primitive have been stored in the image memory 13. These data can new be read from the image memory 13, supplied to a raster output device, and output by well-known methods.

Next several variations of the novel scan-conversion process will be described.

As a first variation, three-dimensional graphic primitives can be processed by including z-coordinate data in the input data, and adding these data and data such as the rate of change of the z-coordinate value in relation to a change in the y-coordinate value to the edge data. Hidden-surface processing can be performed by storing z-coordinate data in a z-buffer in the image memory 13, and comparing these data with the z-coordinates of pixels generated during the scan-conversion process.

As a second variation, instead of having intensity levels, the graphic primitive can be binary-valued, or it can have color values. In the case of color, separate intensity values and intensity increment values can be stored for a set of primary colors such as red, green, and blue, enabling color shading to be provided.

As a third variation, instead of storing the maximum y-coordinate (ymax) of each edge, it is possible to store the difference between the maximum and minimum y-coordinates, and make a corresponding alteration in step 155 in FIG. 12. This variation would be suitable if the input data received from the graphic primitive output device comprised relative coordinate data instead of absolute coordinate data.

As a fourth variation, the graphic primitive need not have straight-line edges; its outline may comprise edges defined, for example, by circular arcs or so-called Bezier curves. For such edges, the well-known forward-difference algorithm can be applied to update the x-coordinate values in step 160 in FIG. 12.

As a fifth variation, the outline of the graphic primitive can comprise two or more distinct closed curves. In this case the vertex data will be linked by the vertex pointers in a plurality of cyclic structures, for each of which the process of creating edge data blocks is performed separately. After all the edge data blocks have been created, next all the starting edge pointers in the common block are sorted in ascending order of the minimum y-coordinates, and the vertex pointers are cleared for use as active edge pointers. The subsequent scanning and conversion processes are carried out in the same way as for a single closed curve.

Figure 21:
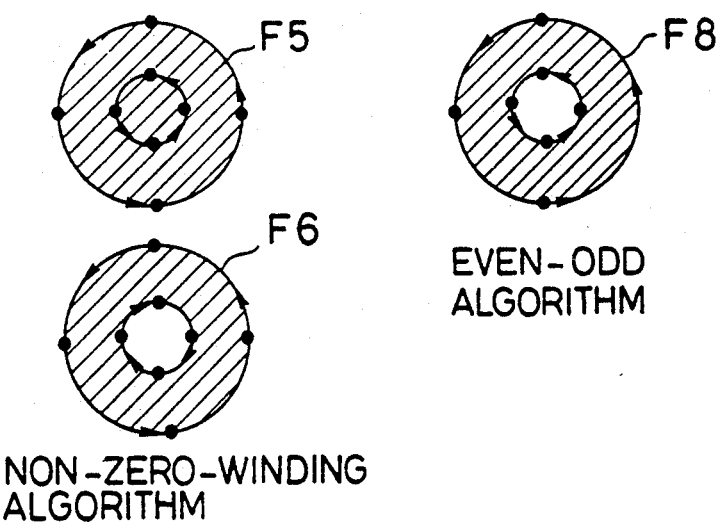
FIG. 21 illustrates graphic primitive defined by two concentric circles.

The last two variations are illustrated in FIG. 21, which shows three graphic primitives defined by two concentric circles each. The way in which these graphic primitives are scan-converted depends on the relative orientation (clockwise or counterclockwise) of the two circles, and on whether the non-zero-winding algorithm or the even-odd algorithm is used. When the non-zero-winding algorithm is used, the central region is filled if both circles are oriented in the same direction, and not filled if the circles are oriented in different directions, as illustrated on the left side of FIG. 21. When the even-odd algorithm is used, the central region is not filled regardless of the relative orientations.

The scope of this invention includes many more variations and modifications that will be apparent to one skilled in the art. In particular, the word structure of the vertex data and edge data is not limited to the structures shown in FIGS. 4 and 9.

What is claimed is:

1. A scan-conversion process for converting a graphic primitive, defined in an x-y coordinate system by an outline comprising vertices joined by edges, to pixel data disposed on scan lines parallel to the x-axis of the x-y coordinate system, comprising steps of:
   (a) acquiring graphic primitive input data and creating vertex data blocks linked cyclically by vertex pointers in an order corresponding to the order of vertices on said outline;
   (b) from said vertex data blocks, constructing edge data blocks comprising at least the minimum and maximum y-coordinate values on respective edges, the x-coordinate value of the vertex with the minimum y-coordinate on respective edges, and the x-coordinate increment value with respect to a unit increment in the y-coordinate value on respective edges;
   (c) grouping said edge data blocks into edge chains representing consecutive upward-inclined or downward-inclined edges, the edge data blocks on respective edge chains being linked by edge chain pointers in ascending order of their minimum y-coordinate values; and
   (d) scanning said graphic primitive on successive scan lines, using said edge chains to identify edges intersecting said scan lines, using said x-coordinate values to create segments disposed on respective scan lines in the interior of said graphic primitive, converting said segments to pixel data, and using said x-coordinate increment values to update said x-coordinate values.

2. The scan-conversion process of claim 1, in which said edge data blocks further comprise edge inclination information indicating whether respective edges are upward-inclined or downward-inclined.

3. The scan-conversion process of claim 2, in which said step (b) comprises steps of:
   (b1) initializing a block parameter;
   (b2) comparing the y-coordinates in the vertex data block indicated by said block parameter and the next vertex data block to determine the inclination of the edge defined by the vertices represented by these vertex data blocks;
   (b3) if said edge is downward-inclined, updating said block parameter to indicate said next data block and returning to step (b2);
   (b4) storing edge data for the edge joining the vertices represented by the vertex data block indicated by said block parameter and the next vertex data block in an edge data block indicated by said block parameter;
   (b5) updating said block parameter to indicate the next vertex data block; and
   (b6) determining whether edge data have been stored for all edges of said graphic primitive, and returning to step (b4) if they have not.

4. The scan-conversion process of claim 3, wherein said step (c) comprises steps of:
   (c1) finding an upward-inclined edge preceded by a downward-inclined edge;
   (c2) linking the edge data blocks of this edge and any consecutive upward-inclined edges on an edge chain in ascending order of their minimum y-coordinate values, and setting a starting edge pointer to the first edge data block on this edge chain in a common data block;
   (c3) finding the next downward-inclined edge, linking the edge data blocks of this edge and any consecutive downward-inclined edges on an edge chain in ascending order of their minimum y-coordinate values, and setting a starting edge pointer to the first edge data block on this edge chain in said common data block;
   (c4) finding the next upward-inclined edge, deciding whether it is the edge found in step (c1), and returning to step (c2) if it is not;
   (c5) sorting said starting edge pointers in said common block in ascending order of the minimum y-coordinate value in the edge data block pointed to thereby.

5. The scan-conversion process of claim 4, wherein said edge data blocks also comprise active edge pointers and said active edge pointers are cleared at the end of said step (c5).

6. The scan-conversion process of claim 5, wherein said step (d) comprises steps of:
   (d1) initializing a scan-line y-coordinate value to the minimum y-coordinate value in the first edge data block on the first edge data chain.
   (d2) finding all edge data blocks the minimum y-coordinate value of which equals said scan-line y-coordinate value, and adding these edge data blocks to an active edge chain on which they are linked by their active edge pointers;
   (d3) sorting said active edge chain in ascending order of the x-coordinate values of the edge data blocks thereon;
   (d4) creating segments disposed on the scan line indicated by said scan-line y-coordinate value in the interior of said graphic primitive;
   (d5) converting said segments to pixel data;
   (d6) searching said active edge chain to find any edge data blocks thereon the maximum y-coordinate value of which equals said scan-line y-coordinate value;
   (d7) if an edge data block found in step (d6) is not the last edge data block on its edge chain, replacing it on said active edge chain with the next edge data block on its edge chain;
   (d8) if an edge data block found in step (d6) is the last edge data block on its edge chain, deleting it from said active edge chain, determining whether said active edge chain is now empty, and terminating the scan-conversion process if it is;
   (d9) updating the x-coordinate values in the edge data blocks on said active edge chain according to the x-coordinate increment values in respective edge data blocks;
   (d10) incrementing said scan-line y-coordinate value and returning to step (d2).

7. The scan-conversion process of claim 1, wherein an even-odd algorithm is used to discriminate between the interior and exterior of said graphic primitive.

8. The scan-conversion process of claim 2, wherein a non-zero-winding algorithm is used to discriminate between the interior and exterior of said graphic primitive.

9. The scan-conversion process of claim 2, wherein the graphic primitive input data acquired in said step (a) include information designating an even-odd algorithm or non-zero-winding algorithm, the designated algorithm being used to discriminate between the interior and the exterior of the graphic primitive.

10. The scan-conversion process of claim 3, wherein said vertex data block indicated by said block parameter and said edge data block indicated by said block parameter are the same block.

11. The scan-conversion process of claim 1, wherein said edge data blocks also comprise an intensity value of the vertex with the minimum y-coordinate on respective edges, and an intensity increment value with respect to a unit increment in the y-coordinate value on respective edges, and said pixel data comprise intensity values which are interpolated between end points of said segments.

12. A scan-conversion processor for converting a graphic primitive, defined in an x-y coordinate system by an outline comprising vertices joined by edges, to pixel data disposed on scan lines parallel to the x-axis of the x-y coordinate system, comprising:

an input register for temporarily storing graphic primitive input data;

an output register for temporarily storing information such as commands and requests;

a control unit for controlling said input register and said output register;

a scan-conversion memory connected to and controlled by said control unit for storing graphic primitive data acquired via said input register, vertex data blocks linked cyclically be vertex pointers, and edge data blocks storing at least a minimum y-coordinate value, a maximum y-coordinate value, an x-coordinate value, and an x-coordinate increment value, respectively, said edge data blocks being linked by edge chain pointers on a plurality of edge chains in ascending order of said minimum y-coordinate values;

a data bus for interconnecting said input register, said output register and said scan-conversion memory;

an address register connected to said data bus and said control unit and controlled by said control unit for indicating locations at which data are stored in said scan-conversion memory;

an address bus connected to said address register for conveying address information from said address register to said scan-conversion memory;

a block address register file connected to and controlled by said control unit for furnishing the addresses of said vertex data blocks and said edge data blocks to said scan-conversion memory via said address bus, and for storing starting edge pointers to said edge chains;

an arithmetic and logic unit connected to and controlled by said control unit and connected to said data bus and said block address register file for receiving, for example, block address information from said block address register file, and executing addition, substraction, and logical operations thereon;

a multiplier/divider connected to and controlled by said control unit and connected to said data bus for executing multiplication and division operations for calculating values such as increment values;

a microprogram storage unit connected to and controlled by said control unit for storing microprograms executed by said control unit, comprising a first microprogram for creating said vertex data blocks from said graphic primitive input data, a second microprogram for constructing said edge data blocks from said vertex data blocks, and a third microprogram for scanning said graphic primitive on successive scan lines, using said edge chains to identify edges intersecting respective scan lines, using said x-coordinate values to create segments disposed on respective scan lines in the interior of said graphic primitive, converting said segments to pixel data, and using said x-coordinate increment values to update said x-coordinate values; and a memory controller connected to and controlled by said control unit and connected to said data bus for receiving said pixel data and writing them in an external device such as an image memory.

13. The scan-conversion processor of claim 12, wherein said control unit controls said address register to overwrite said vertex data blocks with said edge data blocks.

14. The scan-conversion processor of claim 12, wherein said third microprogram employs an even-odd algorithm for discriminating between the interior and exterior of said graphic primitive.

15. The scan-conversion processor of claim 12, wherein said edge data blocks also comprise edge inclination information indicating whether respective edges are upward-inclined or downward-inclined.

16. The scan-conversion processor of claim 15, wherein said third microprogram employs a non-zero-winding algorithm for discriminating between the interior and exterior of said graphic primitive.

17. The scan-conversion processor of claim 15, wherein said third microprogram selects either an even-odd algorithm or said non-zero-winding algorithm for discriminating between the interior and exterior of said graphic primitive.

18. The scan-conversion processor of claim 12, wherein said edge data blocks also comprise an intensity value of the vertex with the minimum y-coordinate on respective edges, and an intensity increment value with respect to a unit increment in the y-coordinate value on respective edges.

* * * * *